Figure 1:
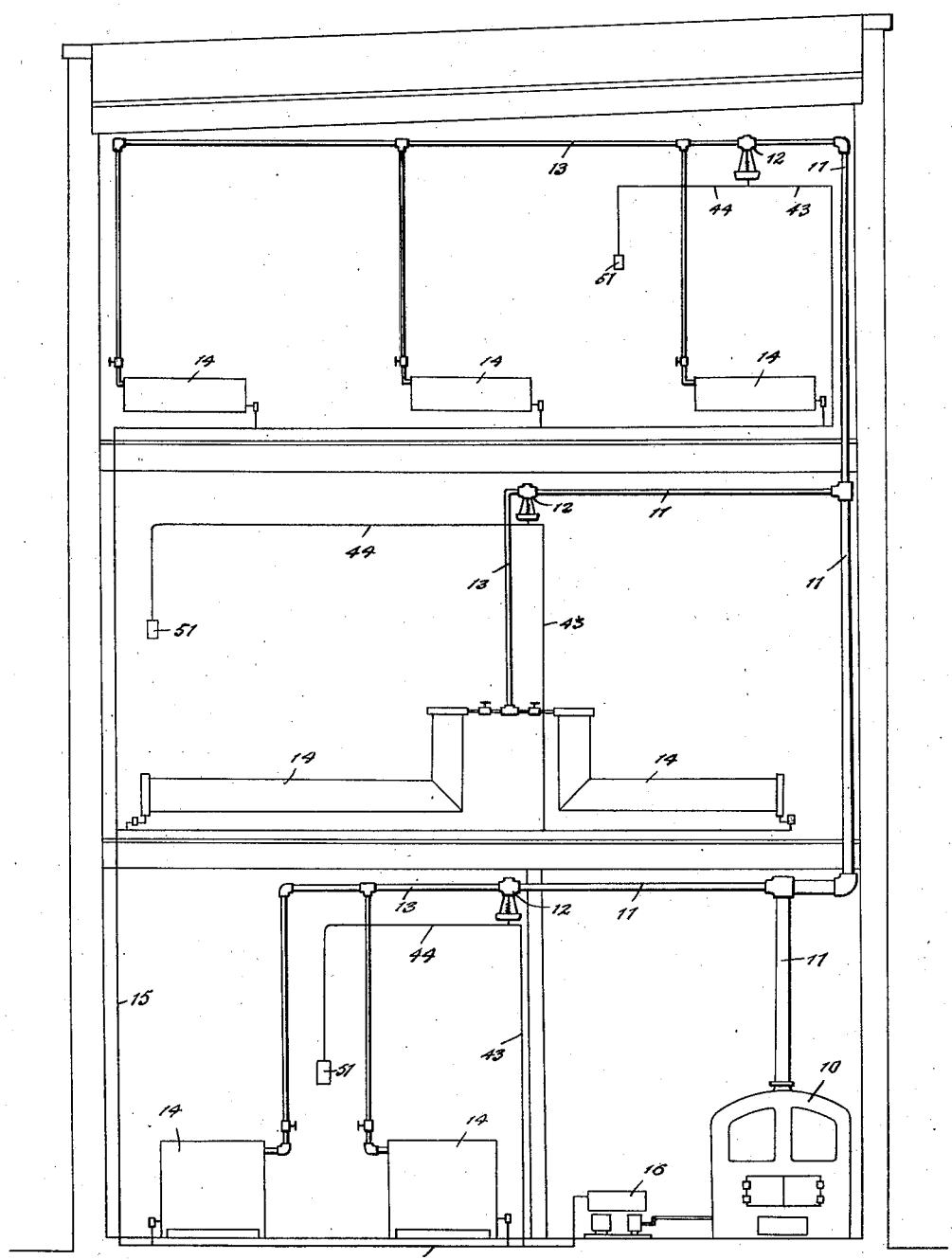

Dec. 21, 1926.

A. B PINKHAM 1,611,554

THERMOSTATIC VACUUM TEMPERATURE CONTROL SYSTEM FOR HEATING PLANTS

Filed August 11, 1923    2 Sheets-Sheet 1

Inventor
ALEXANDER B. PINKHAM.
By Chamberlain & Newman
Attorney

Dec. 21, 1926.

A. B PINKHAM 1,611,554

THERMOSTATIC VACUUM TEMPERATURE CONTROL SYSTEM FOR HEATING PLANTS

Filed August 11, 1923    2 Sheets-Sheet 2

Inventor
ALEXANDER B. PINKHAM.

By Chamberlain + Newman
Attorney

Patented Dec. 21, 1926.

UNITED STATES PATENT OFFICE.

ALEXANDER B. PINKHAM, OF BRIDGEPORT, CONNECTICUT.

THERMOSTATIC VACUUM TEMPERATURE CONTROL SYSTEM FOR HEATING PLANTS.

Application filed August 11, 1923. Serial No. 656,917.

The present invention relates to an improved thermostatic vacuum temperature control system for heating plants, particularly for controlling the flow of heating fluid, such as steam or hot water, through heating pipes, coils, radiators, chambers or the like.

An object of the invention is to provide a distant control device, operated by atmospheric pressure to one position, and by air at less than atmospheric pressure to its other position, untilizing the vacuum return line of a vacuum heating system, where such is provided, or an independent vacuum pump, where some other system is employed.

Another object of the invention is to provide a simplified thermostatic control free from the complication of systems operated by electricity, clock-work, or fluid above atmospheric pressure, for maintaining a constant or nearly constant temperature in workrooms, offices, dwellings, churches, hospitals, and other buildings where it is necessary or desirable to maintain such temperature for the comfort or welfare of the inhabitants, and the conservation of fuel.

A further object is to provide a device which will be direct and positive in action, and which may be adjusted with facility to determine the temperature to be maintained. A still further object is to provide a system which may be installed with the installation of new heating plants, or which may be conveniently applied to those already in use.

With the above and other objects in view, an embodiment of the invention is shown in the accompanying drawings, and this embodiment will be hereinafter more fully described with reference thereto, and the invention will be finally pointed out in the claim.

Figure 2:
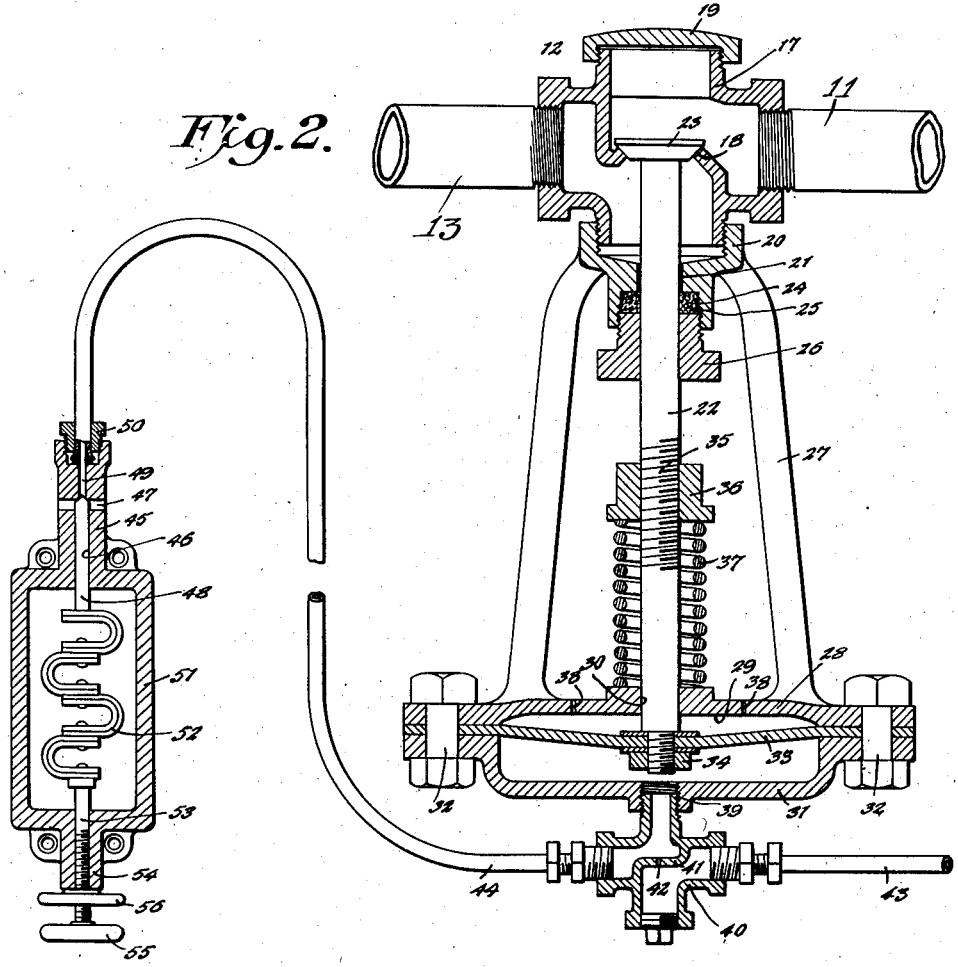

In the drawings:

Fig. 1 is a partial diagrammatic view showing a heating plant of the vacuum type, installed in a building, and provided with a control system according to the invention; and Fig. 2 is a vertical sectional view of the control means.

Similar reference characters indicate corresponding parts throughout the several figures of the drawings.

Referring to the drawings, and more particularly to Fig. 1 thereof, in which a three story building is illustrated, the boiler 10 of the steam type is provided with a steam conduit 11, having suitable branches extending to the control valves 12 on each floor, and from which the steam flows through pipes 13 to the radiators 14. A vacuum return line 15 extends from the radiators to the vacuum pump 16, and in which a partial vacuum is maintained, as is usual in vacuum heating systems.

The control valves 12, which are of similar construction, and adapted, according to my invention, to be controlled by thermostatic vacuum means, consist of a valve casing 17, to each side of which the pipes 11 and 13 are secured, and provided interiorly with a horizontal valve seat 18. The upper chamber of the valve is closed by a removable cap 19, while the lower chamber is provided with a closure fitting 20 having a passage 21 therethrough, in which the valve stem 22 is slidably engaged, its valve head 23 seating on the seat 18. The fitting 20 is provided at its under side with a recess 24 in which a washer 25 is inserted and held by an apertured nut 26 surrounding the valve stem and screwed into the fitting.

A plurality of downwardly extending supporting legs 27 are integrally formed upon the under side of the fitting 20, and to the lower ends of which is integrally connected the top plate 28 of a diaphragm chamber, said plate being annularly recessed at its under surface, as at 29, and provided with a central passage 30, through which the valve stem extends. The diaphragm chamber is completed by a lower flanged and interiorly dished member 31, secured to the top plate by bolts 32, the marginal portion of the diaphragm 33 being secured between the plate and the flange of the member 31. The diaphragm is secured at its center to the lower threaded end of the valve stem by a nut 34.

The valve stem is provided intermediate its ends with screw-threads 35, upon which a nut 36 is engaged, a spring 37 being interposed between this nut and the plate 28, which normally tends to raise the valve stem, to thereby unseat the valve head and permit the flow of heating fluid through the valve.

The upper space of the diaphragm chamber is open to the atmosphere by means of vent holes 38, while the lower space is adapted to have a partial vacuum created therein, to draw down the diaphragm and seat the valve, the valve being unseated through the action of the spring 37 upon breaking the vacuum by the admission of atmospheric air. To this end a central threaded aperture 39 is provided in the member 31, to which is secured a restrictor fitting 40, provided interiorly with a web or diaphragm 41 having a small orifice 42 therein, and connected at one side to a capillary tube 43 extending to the vacuum return line 15 of the heating system. At its other side there is secured a capillary tube 44 extending to a thermostatically operated actuating valve, which may be located at any convenient place in the room.

This valve comprises a casing 45 having a vertical passage 46 therein and a transverse passage 47 at its upper end in communication with the atmosphere, a pilot valve 48 being provided in the vertical passage, which is adapted to seat upon and close the end of a vertical orifice 49 extending upwardly from the transverse passage and into communication with the capillary tube 44, which is secured to the valve casing by a gland nut 50. The orifice 49 is of a larger diameter than the orifice 42 of the restrictor, so as to allow the vacuum beneath the diaphragm to be directly broken, upon the admission of atmospheric air through the tube 44.

A thermostat casing 51 extends beneath the valve casing 45, and has mounted therein a thermostatic element 52, of the bimetal type, and bearing at its upper end upon the pilot valve 48 to maintain it closed in the expanded position of the thermostat, and adapted to permit the valve to open upon contraction of the thermostat. The lower end of the thermostat is supported upon an adjustable screw 53 engaged in a threaded bearing 54 and provided at its lower end with a hand-wheel 55, a lock-nut 56 adapted to secure the adjusted position of the screw. By proper adjustment of the thermostat the temperature at which the pilot valve will be operated to open and closed positions may be accurately regulated and predetermined. It will be understood that other forms of thermostats may be employed, as for instance volatile or expansive fluid types.

The operation of the system is as follows:

The partial vacuum maintained beneath the diaphragm 33 with the pilot valve 48 closed, retains the valve 23 upon its seat against the force of the spring 37, and the flow of the heating fluid to the radiators is thereby cut off. As the temperature in the room decreases, the thermostat contracts and at a predetermined point the pilot valve is lowered out of engagement with its seat, and atmospheric air is admitted through the passage 47 and orifice 49 to the capillary tube 44 and beneath the diaphragm 33, thus breaking the vacuum and permitting the valve 23 to open under the force of the spring 37. Heating fluid then passes through the valve to the radiators, causing the temperature to again rise to a point where the expansion of the thermostat will close the pilot valve, this action causing the air beneath the diaphragm to be exhausted through the orifice 42 and tube 43, the valve 23 being again seated to stop the flow of the heating fluid.

The action is direct and positive, and the system is free from the complication and annoyance of systems employing electricity, clock-work, or fluid under pressure above atmosphere. Where the invention is employed in connection with heating systems which do not have a vacuum return line, an independent vacuum pump may be used to exhaust the air through the tube 43.

I have illustrated and described a preferred and satisfactory embodiment of the invention, but it will be obvious that changes may be made therein, within the spirit and scope thereof, as defined in the appended claim.

Having thus described my invention, what I claim and desire to secure by Letters Patent is:

In a temperature control system, a heating fluid conduit, a valve in said conduit, vacuum controlled means for operating said valve, means for admitting and exhausting air with relation to said means, and including a restrictor fitting secured to said means and communicating with the interior thereof; having a relatively small air exhausting orifice, an exhausting means connected to said last named means and adapted to exhaust air through said orifice, the restrictor fitting including an air admission port, a valve casing having an air admission orifice, a tube connecting said air admission orifice and port, said air admission orifice and port being relatively larger than said air exhausting orifice and having direct connection with said vacuum controlled means, a valve adapted to control the admission of air to said air admission orifice, and thermostatically operated means for opening and closing said last mentioned valve.

Signed at Bridgeport, in the county of Fairfield and State of Connecticut, this 6th day of August, A. D., 1923.

ALEXANDER B. PINKHAM.